United States Patent [19]

Feuer et al.

[11] Patent Number: 5,980,117
[45] Date of Patent: Nov. 9, 1999

[54] METHODS AND ARRANGEMENTS FOR DUPLEX FIBER HANDLING

[75] Inventors: Mark D. Feuer, Colts Neck; Joseph E. Ford, Oakhurst, both of N.J.

[73] Assignee: Lucent Technologies, Inc., Murray Hill, N.J.

[21] Appl. No.: 08/970,690

[22] Filed: Nov. 14, 1997

Related U.S. Application Data

[63] Continuation of application No. 08/688,178, Jul. 26, 1996, abandoned.

[51] Int. Cl.⁶ .................................................... G02B 6/36
[52] U.S. Cl. ................................. 385/78; 385/59; 385/60; 385/67; 385/84
[58] Field of Search ............................... 385/59, 60–68, 385/78–85

[56] References Cited

U.S. PATENT DOCUMENTS

| | | | |
|---|---|---|---|
| 4,264,127 | 4/1981 | Schmacher et al. | 385/85 |
| 4,946,247 | 8/1990 | Muska et al. | 350/96.2 |
| 4,989,946 | 2/1991 | Williams et al. | 350/96.2 |
| 5,293,435 | 3/1994 | Takahashi | 385/85 |
| 5,394,494 | 2/1995 | Jennings et al. | 389/60 |
| 5,454,057 | 9/1995 | Arima et al. | 385/46 |
| 5,745,626 | 4/1998 | Duck et al. | 385/96 |

FOREIGN PATENT DOCUMENTS

| | | |
|---|---|---|
| 2 393 329 | 12/1978 | France . |
| 23 63 984 | 6/1975 | Germany . |

OTHER PUBLICATIONS

Webster's Ninth New Collegiate Dictionary; p. 927, 1986.
Pat. Abtracts of Japan, vol. 010, No. 165 (P–467), Jun. 12, 1986 (Fujitsu KK).

*Primary Examiner*—Hung N. Ngo

[57] ABSTRACT

Methods and apparatus for a dual-fiber ferrule are disclosed. A hole having a preferably elliptical shape and a size suitable for receiving two bare optical fibers is formed along the axis of symmetry of a retaining member. The elliptically-shaped hole determines the angular position of the center of fiber cores of the optical fibers within the retaining member. The dual-fiber ferrule can be used for forming improved optical connectors. A registration feature on the retaining member of the dual-fiber ferrule used in such connectors allows for passive alignment of the optical fibers of one connector with the fibers of another connector when forming an optical link. The optical link includes two such dual-fiber ferrules and a dual-fiber mating sleeve having a feature for engaging the registration feature of each retaining member. In a further aspect, the dual-fiber ferrule can be used for forming improved photonics packages containing two photonics devices, each of which are in optical communication with one of the optical fibers.

8 Claims, 5 Drawing Sheets

5,980,117

METHODS AND ARRANGEMENTS FOR DUPLEX FIBER HANDLING

This application is a continuation of application Ser. No. 08/688,178, filed Jul. 26, 1996, now abandoned.

FIELD OF THE INVENTION

The present invention relates to methods and apparatus for packaging and handling two optical fibers.

BACKGROUND OF THE INVENTION

Two-way fiber optic communications links are often implemented using separate fibers for the transmitted and received data signals. Using separate fibers may result in reduced noise and crosstalk in comparison with using a single fiber for handling both signals.

Typically, a conventional duplex connector consisting of two independent connectors joined by a plastic housing is used for making optical connections in such two-fiber systems. Each of the connectors comprising the conventional duplex connector is coupled to one of the optical fibers. Each of such fibers is separately cabled, and the two optical fibers are usually connected to separate transmitter and detector devices.

Each of the connectors forming the duplex connector includes a cylindrical ferrule, typically ceramic, which receives the optical fiber in a single hole running along the axis of symmetry of the ferrule, i.e., the center of the ferrule. Locating the hole through the center of the ferrule aids in fabricating the ferrule with the sub-micron tolerances required for single mode fiber alignment.

It would be preferable to hold two fibers in a single ferrule. Such a ferrule would facilitate using a single connector, rather than two joined connectors, for duplex fiber handling. Since the cost of the conventional duplex connector described above is about equal to that of two separate simplex connectors, using a single connector for this service would provide a significant cost savings. The manufacturing techniques used for forming conventional single-fiber ferrules, i.e., forming a single hole at the center of the ferrule, cannot be used, however, for forming two holes positioned with the accuracy required for single-mode fiber alignment.

Thus, a ferrule suitable for receiving two optical fibers, methods for its manufacture, and photonics connectors and packages incorporating such a ferrule would be desirable.

SUMMARY OF THE INVENTION

Methods and apparatus for a dual-fiber ferrule are disclosed. A hole having a diameter about twice that of a bare optical fiber is formed coincident with the longitudinal axis of symmetry of a retaining member. Two bare optical fibers are placed within the hole. In a preferred embodiment, the hole has an elliptical shape that defines the position of center of the fiber cores of the fibers within the retaining member. In a further preferred embodiment, a registration feature is provided on the retaining member.

In a further aspect of the invention, a dual-fiber ferrule having a registration feature is used to form a duplex connector. Two such connectors, in conjunction with a mating sleeve, form an optical link. The registration feature can cooperate with a complementary feature in the mating sleeve to provide passive alignment of the fibers from each connector. In another aspect of the present invention, a dual-fiber ferrule is used in conjunction with a transmitter and a receiver to form a dual-fiber photonics package. One of the bare fibers within the dual-fiber ferrule delivers a first optical signal to the receiver, and the other fiber receives a second optical signal from the transmitter.

BRIEF DESCRIPTION OF THE DRAWINGS

Further features of the invention will become more apparent from the following detailed description of specific embodiments thereof when read in conjunctin with the accompanying drawings, in which like elements have like reference numerals and in which:

FIG. 1b shows two exemplary rotational orientations of bare optical fiber with the illustrative unoriented dual-fiber ferrule of FIG. 1a;

DETAILED DESCRIPTION

Figure 1A:
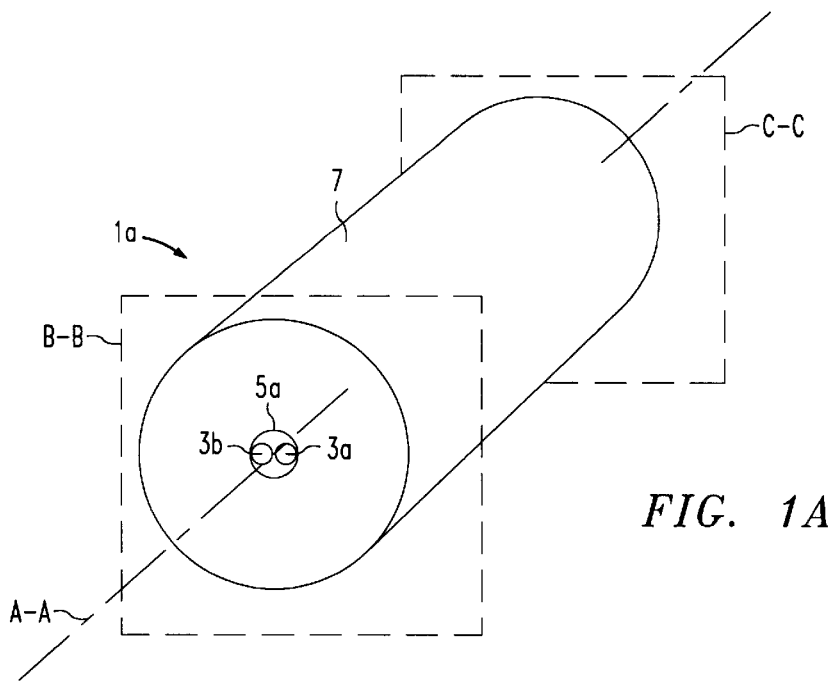
FIG. 1a is an illustrative embodiment of an unoriented dual-fiber ferrule according to the present invention.

FIG. 1a is an illustrative embodiment of a dual-fiber ferrule 1a according to the present invention. The dual-fiber ferrule 1a is used to place two bare optical fibers in a fixed predetermined position for use in, for example, connectors and photonics packages. The dual-fiber ferrule 1a consists of a round hole 5a located along symmetry axis A—A running through end planes B—B and C—C of a preferably cylindrical retaining member 7. The retaining member 7 is formed from a hard, precisely formable and stable material, typically a ceramic.

Bare optical fibers 3a and 3b are received by the round hole 5a. The term "bare optical fiber," as used herein, refers to the conventional structure of a small transparent core, surrounded by a concentric cladding layer. The cladding layer has a refractive index that is different from the refractive index of the core. As a result, light energy is confined to the core region. The fiber can be single mode or multimode, and can be made of glass, plastic or other transparent media. A typical single mode glass fiber may have a core diameter of about 5 to 10 microns ($\mu$m). The outer diameter of the glass cladding of such a typical single mode glass fiber is about 125 $\mu$m. The term "optical fiber" refers to a coated bare optical fiber. The coating, which can be plastic or other suitable materials, protects the bare fiber from scratches and other environmental stress. For a single mode fiber, the outside diameter of the coating is typically about 250 $\mu$m. The term "optical cable" refers to jacketed optical fiber. A jacket, typically formed of a plastic material and having an outside diameter of about 3 mm encloses one or more optical fibers. The annular region between the optical fibers and the jacket is usually filled with a 900 μm diameter buffer tube surrounded by a plurality of fibrous strength members for providing padding and stress relief In comparison with a prior art single-fiber ferrule for retaining a single bare optical fiber, such as the fiber 3a, the hole 5a is oversized by a factor of about 2 if the bare optical fibers 3a and 3b have about the same diameter. More specifically, in conventional single-fiber ferrules, the central hole is about 125 μm in diameter, which, as noted above, is the outside diameter of a typical bare optical fiber. In the dual-fiber ferrule 1a, the hole 5a is about 250 μm in diameter, if the ferrule receives two 125 μm fibers. Thus, the bare optical fibers 3a and 3b simply lie side-by-side in the hole 5a. Since the hole 5a is round, the fibers 3a and 3b must lie symmetrically across the symmetry axis A—A. Such symmetry facilitates using the dual-fiber ferrule in optical connectors and packages having stringent alignment tolerances, so that a dual-fiber ferrule according to the present invention is suitable for use with single mode, as well as multimode fiber applications.

More generally, the diameter of the hole 5a is about equal to the sum of the diameters of the two fibers to be contained by the dual-fiber ferrule. The two fibers can have different or similar diameters. Thus, the hole 5a has a diameter dictated by the size of the fibers that it receives. It should be understood, however, that if the bare optical fibers received by the hole 5a have different diameters, then such fibers will not lie symmetrically across the symmetry axis A—A.

Figure 1B:
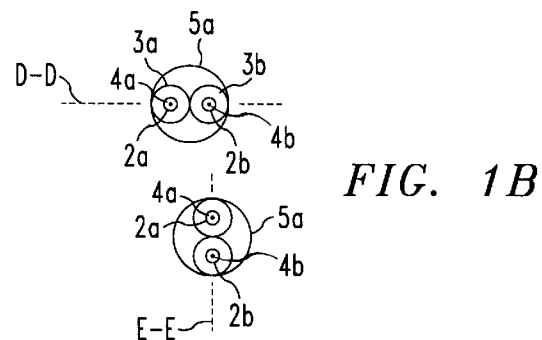

It will be appreciated that in the dual-fiber ferrule 1a, the rotational orientation of the fibers 3a and 3b within the hole 5a is not defined. For example, as illustrated in FIG. 1b, in a first rotational orientation, the fibers 3a, 3b may assume a position such that the center 4a, 4b of each fiber core, 2a, 2b, respectively, is aligned with an axis D—D. In a second rotational orientation of the fibers 3a, 3b, the centers 4a, 4b align with the axis E—E, at ninety degrees to the axis D—D. It will be appreciated that to place the fiber cores 2a, 2b in optical communication with, for example, a second set of fiber cores, the centers 4a, 4b of the fiber cores 2a, 2b, must have approximately the same rotational orientation as its analog in the other set. The circular hole 5a precludes such definition, unless an alignment feature indicative of the orientation of the fibers 3a, 3b is formed on the dual-fiber ferrule 1a after the fibers are placed in the hole and fixed in position. A second illustrative embodiment of a dual-fiber ferrule 1b that allows for passive angular definition and registration is shown in FIG. 2.

The dual-fiber ferrule 1b, referred to herein as an oriented dual-fiber ferrule, includes a hole 5b that is not round in shape like the hole 5a of the ferrule 1a, referred to hereinafter as an unoriented dual-fiber ferrule. Rather, the hole 5b has a shape that provides for angular definition. In other words, when the two bare fibers 3a, 3b are within the hole 5b, the center 4a, 4b of each fiber core 2a, 2b will adopt a single defined rotational orientation within the hole. The hole 5b will provide such definition, for example, if the hole has a shape facilitating three-line contact between the fibers 3a, 3b and the hole 5b. An exemplary shape providing such contact, as illustrated in FIG. 2, is an ellipse. Other shapes that restrict the rotational orientation of the received fibers 3a, 3b may suitably be used.

The dual-fiber ferrule 1b optionally includes a registration feature 9 that can be located on the outside of the retaining member 7. The registration feature 9 provides registration for the defined orientation of the optical fibers 3a and 3b. The registration feature 9 facilitates aligning the retained bare optical fibers 3a, 3b with, for example, other such bare optical fibers or with photonics devices. Thus, the oriented dual-fiber ferrule 1b can be used advantageously for forming improved optical connectors and optical packages, as described later in this specification.

Figure 2:
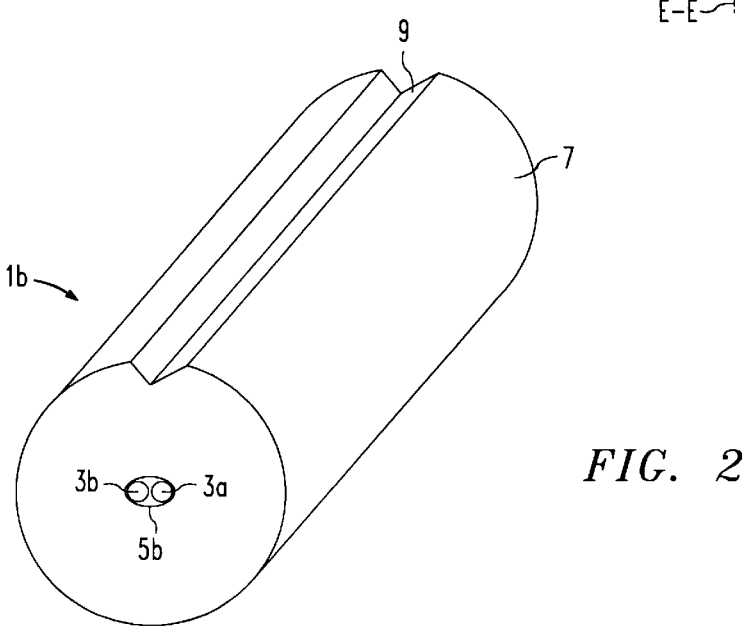
FIG. 2 shows a second illustrative embodiment of an oriented dual-fiber ferrule according to the present invention.
Figure 3:
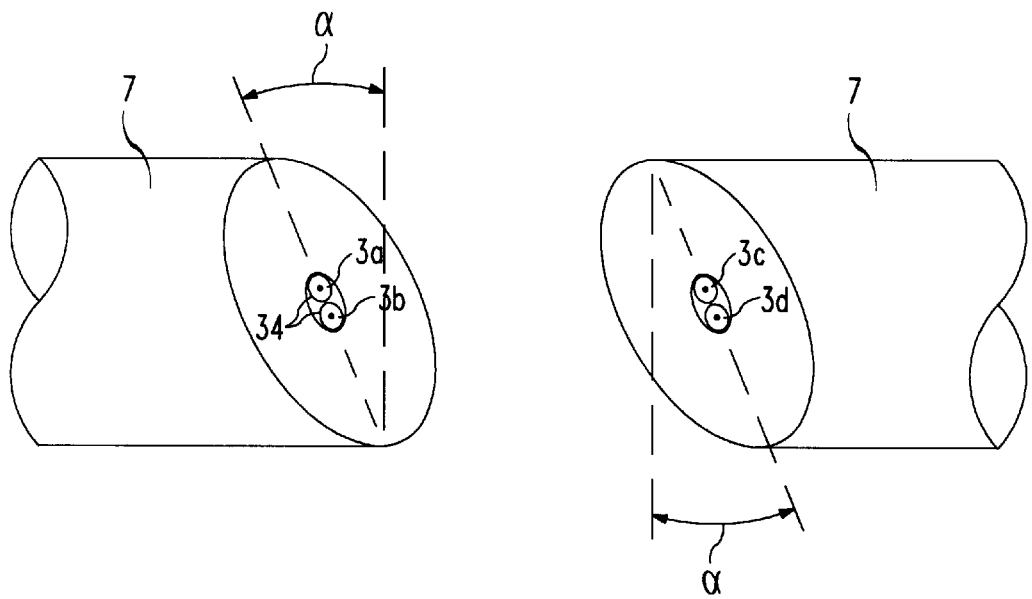
FIG. 3 shows the bare optical fibers of the dual-fiber ferrule of FIG. 2 polished to provide a registration feature.

The registration feature 9 can be, without limitation, a groove or channel, such as the v-groove pictured in FIG. 2. Alternatively, the registration feature 9 can be a flat face or protrusion adapted to mate with a complementary feature in a structure that receives the oriented dual-fiber ferrule 1b. In a further embodiment, the registration feature 9 is the polish angle of the face of the ferrule, as illustrated in FIG. 3. The end 34 of each of two sets of two fibers 3a –3d is also polished at an angle, α, which aids in reducing back-reflection coupling into the optical fibers. It should be understood that in FIG. 3, the polish angle is exaggerated for illustrative purposes. It will be appreciated that in an application where two such sets of optical fibers are placed in physical contact, such as when two fiber connectors incorporating dual-fiber ferrules according to the present invention are joined in a mating sleeve, the angled polish of the dual-fiber ferrules 1b and the fibers 3a –3d will cause the fibers to mate in a single orientation.

The exemplary unoriented dual-fiber ferrule 1a can also be provided with a registration feature, such as, without limitation, the polish angle of the retaining member 7. For the unoriented dual-fiber ferrule, the registration feature must be fabricated after the two fibers are placed and fixed, such as by epoxy, within the hole 5a. It should be recognized that, in view of the present teachings, a variety of other structures and arrangements may be devised by those with ordinary skill in the art to provide the function of the registration feature 9.

The holes 5a and 5b can be formed in a conventional manner as part of the ferrule manufacturing process. In particular, the holes can be formed during extrusion of the clay-like ceramic before firing by, for example, placing a wire or the like in the material during extrusion through an appropriately configured extrusion die. Presently, such methods cannot be used to form two separate holes (one hole for each bare fiber) with the precision required for single mode optical fiber. Thus, by forming a single "double-sized" hole according to the present invention, a precisely located dual-fiber ferrule is formed using standard manufacturing methods.

The registration feature 9, when embodied as a groove, channel or other feature in the retaining member 7, is formed, like the hole, by using an appropriately configured extrusion die and other shaping members as appropriate. After the bare optical fibers 3a and 3b are placed in the hole 5a or 5b, the hole can be filled with epoxy to fix the bare optical fibers in place. The bare fibers 3a and 3b are polished at the same time using standard polishing methods.

A dual-fiber ferrule according to the present invention, such as the illustrative dual-fiber ferrules 1a and 1b described above, can be used to form improved optical connectors and optical packages as described below.

Figure 4:
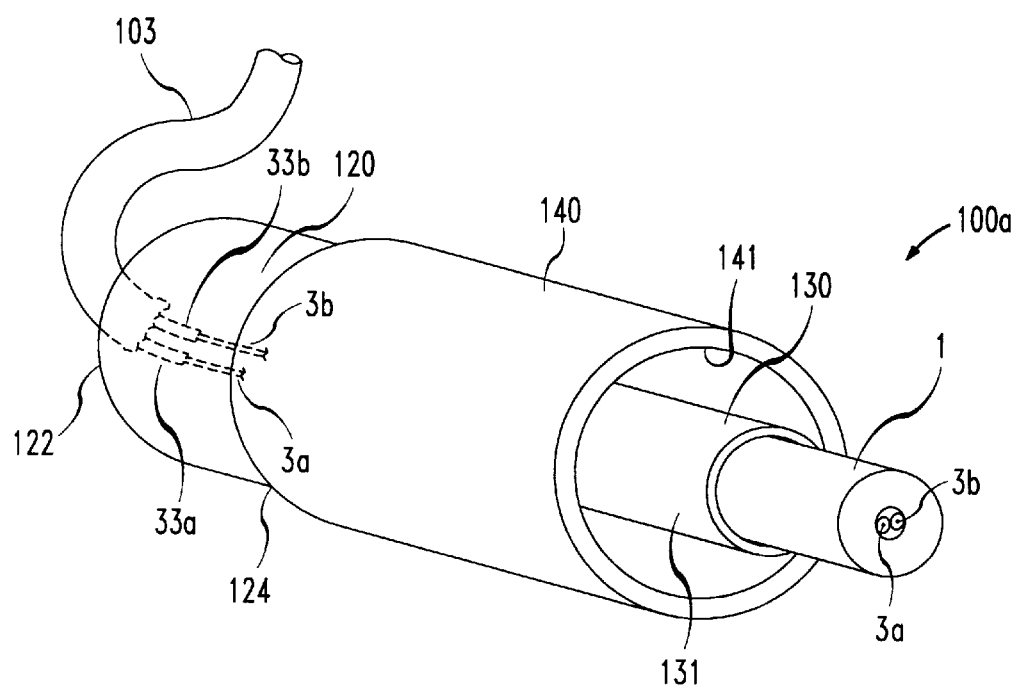
FIG. 4 shows an exemplary embodiment of a duplex connector utilizing the dual-fiber ferrule of FIG. 1 or 2.

An exemplary embodiment of an improved duplex connector 100a according to the present invention is shown in FIG. 4. The exemplary duplex connector 100a includes an optical fiber cable 103 containing optical fibers 33a and 33b, a strain relief boot 120, a dual-fiber ferrule 1, an inner housing 130 and an outer housing 140. Alternatively, the connector 100a can include two optical fiber cables each containing one of the optical fibers 33a, 33b.

The strain relief boot 120, which is formed of a suitably flexible material, typically plastic, receives the optical fiber cable 103 at a first end 122. The second end 124 of the strain relief boot 120 receives the outer housing 140, which is typical formed of metal or hard plastic. The strain relief boot 120 protects the bare optical fibers 3a, 3b from breakage after the jacket is removed from the fiber cable 103 and the plastic coating is removed from the optical fibers 33a and 33b as is required for fitting the bare optical fibers within the hole through the dual-fiber ferrule 1. The dual-fiber ferrule 1 is retained within the inner housing 130, which is usually cylindrical in shape and formed of metal or hard plastic. Like conventional single ferrule connectors, the inner surface 141 of the outer housing 140 can be threaded, not illustrated. Additionally, the outer surface 131 of the inner housing can include an alignment feature, not shown, for gross alignment with a mating sleeve, as in conventional connectors.

Figure 5A:
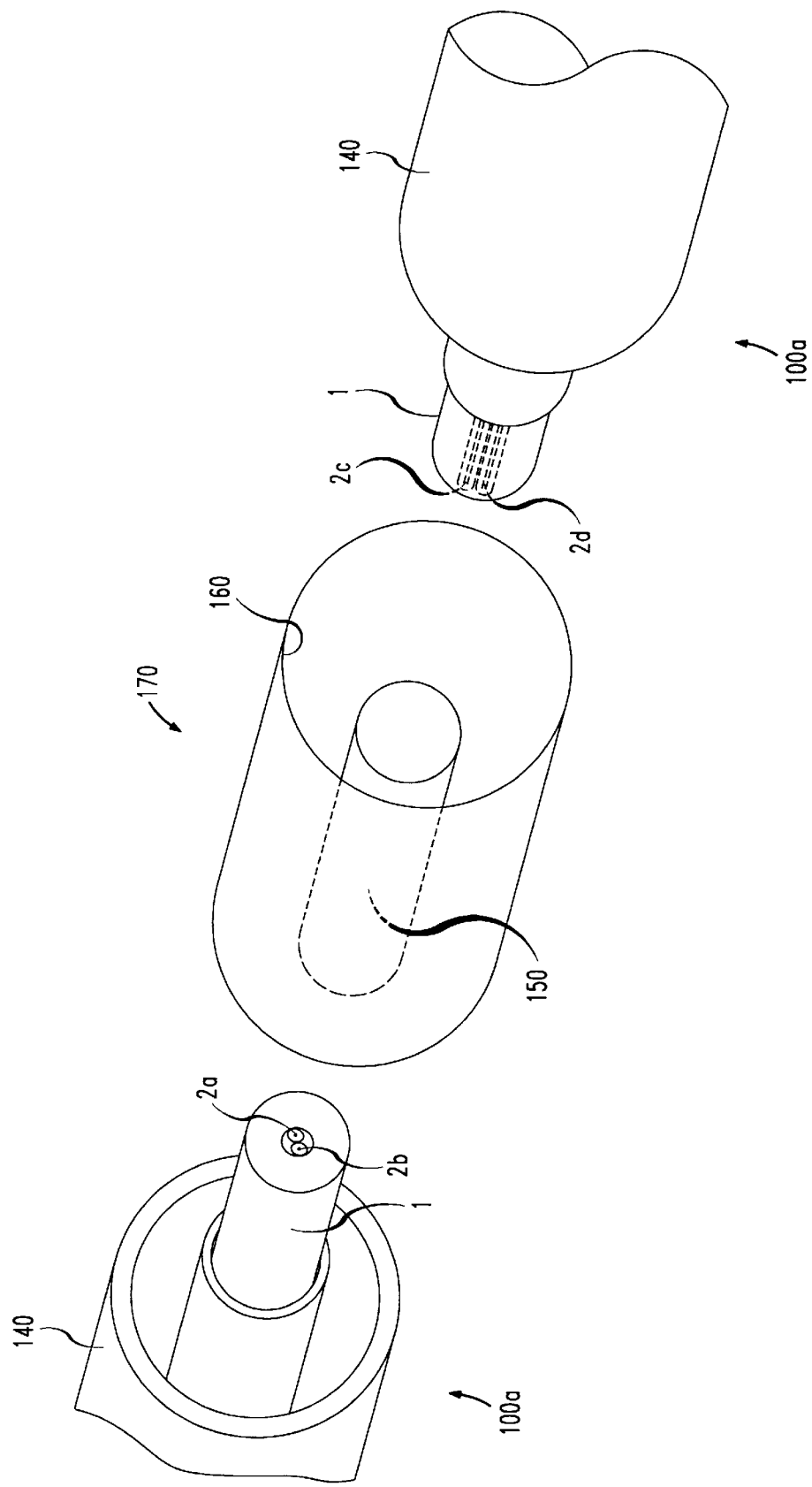
FIG. 5 shows two duplex connectors according to FIG. 4 and a mating sleeve for creating a fiber link.
Figure 5B:
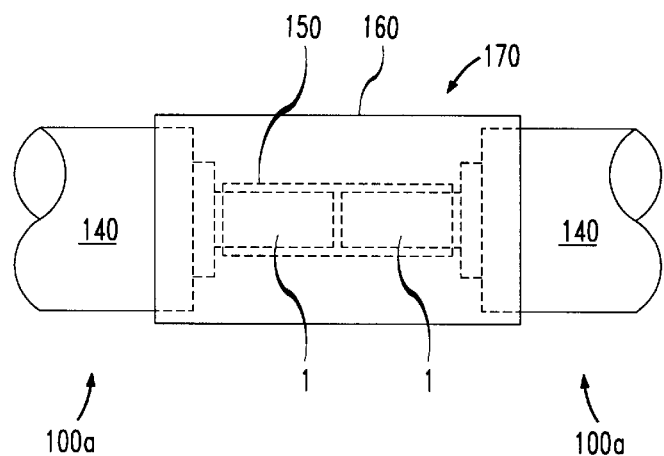

Two such duplex connectors 100a can be used in conjunction with a mating sleeve 170 to provide an optical link, as shown in FIG. 5. The mating sleeve 170 includes an inner sleeve 150, typically ceramic, which receives the ferrules 1 from each of the duplex connectors 100a. The mating sleeve further includes a housing 160, which receives the outer housing 140 of each of the connectors 100a. In one embodiment, the outer surface 161 of the housing 160 can be threaded, not shown, to engage threads, not shown disposed on the inner surface 141 of the outer housing 140 of the connectors 100a. In other embodiments, the housing 160 can receive the connectors 100a in a press fit or bayonette-type mount.

Fiber cores 2a, 2b and 2c, 2d are exposed at the end 11 of the dual-fiber ferrule 1 of each of the connectors 100a. When properly mated, the cores 2a, 2b of one of the connectors 100a abut the fiber cores 2c, 2d of the other connector 100a within the inner sleeve 150.

It will be appreciated that each fiber core must be optically coupled to the appropriate fiber core from the other connector 100a. In embodiments of connectors in which the dual-fiber ferrule 1 is unoriented, like the ferrule 1a, a mating sleeve specifically adapted for the unoriented ferrule is used. Such a mating sleeve allows at least one of the connectors 100a to rotate so that the fiber cores 2a –2d can be aligned. Active alignment, such as sending an optical test signal through a fiber, is required. Once aligned, the at least one connector that is free to rotate should be fixed in place by a locking mechanism. The design of such a mating sleeve is within the capabilities of those skilled in the art.

Figure 6:
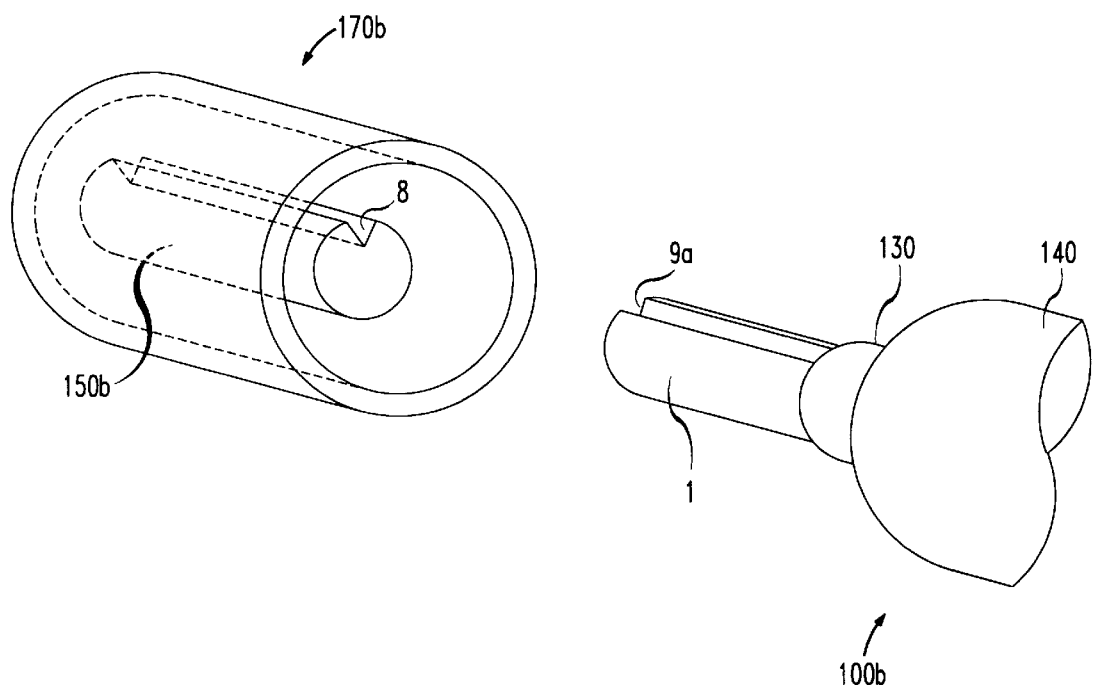
FIG. 6 shows an exemplary embodiment of a mating sleeve adapted for use with the oriented dual-fiber ferrule of FIG. 2.

FIG. 6 is an exemplary embodiment of a mating sleeve 170b adapted for use with a connector using an oriented dual-fiber ferrule with a registration feature, such as the ferrule 1b described above. The mating sleeve 170b includes an inner sleeve 150b that includes a feature shaped to engage the registration feature in the ferrule 1. For example, in the exemplary embodiment of FIG. 6, the inner sleeve 150b has a v-shaped ridge 8 for engaging the v-groove 9a in the dual-fiber ferrule 1 of the connector 100b.

In the illustrative embodiment of FIG. 6, the fibers in each connector 100b, only one of which connectors is shown, are aligned by the aforementioned passive alignment features. As such, rotation of a connector 100b within the mating sleeve 170b is not necessary or desirable.

As noted above, a dual-fiber ferrule according to the present invention can be used to form dual-fiber photonics packages. In one dual-fiber photonics package, several illustrative embodiments of which are described in detail below, the bare optical fibers of a dual-fiber ferrule are in optical communication with a surface normal optoelectronic transmitter and receiver.

Figure 7:
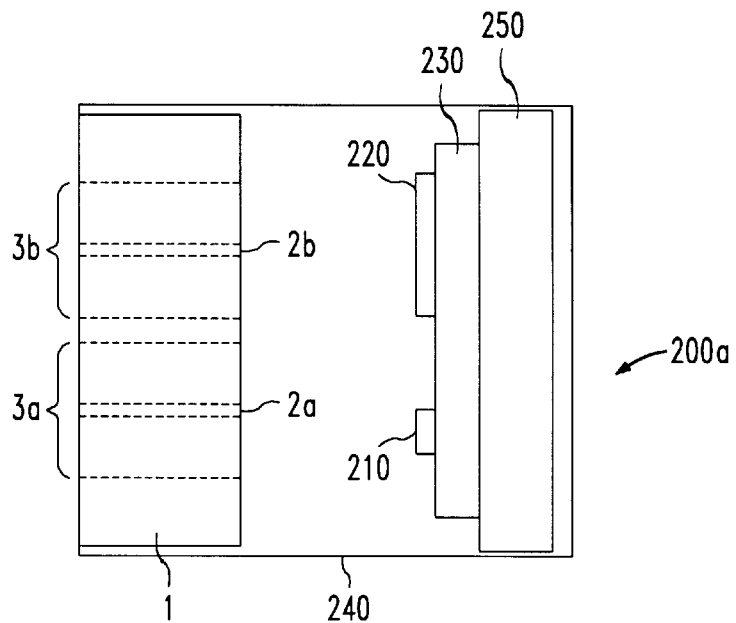
FIG. 7 illustrates an exemplary embodiment of a dual-fiber photonics package using the dual-fiber ferrules of FIG. 1 or 2.

An illustrative embodiment of a dual-fiber photonics package 200a is shown in FIG. 7. In the photonics package 200a, a dual-fiber ferrule 1 is butt-coupled to a surface normal optoelectronic transmitter 210 and a surface normal optoelectronic receiver 220. Suitable transmitters 210 include, without limitation, surface emitting diode lasers, such as vertical cavity surface emitting lasers (VCSEL) or an edge-emitting diode combined with an angled reflecting surface, as well as light emitting diodes (LED) and also optical modulators, such as micromechanical and semiconductor optical modulators. Suitable receivers 220 include, without limitation, photoconductors, photodetectors, avalanche photodiodes, phototransistors, heterojunction photodiodes, P-I-N multiple quantum well detectors, avalanche detectors, heterojunction photodiodes and metal-insulator-III-V photodiodes.

If the transmitter 210 is a micromechanical optical modulator, it preferably operates with a variable reflectivity to an optical signal. Exemplary variable reflectivity optical modulators are disclosed in U.S. Pat. No. 5,500,761, and co-pending U.S. patent application Ser. No. 08/283,106 filed Jul. 29, 1994, U.S. patent application Ser. No. 08/578,590 filed Jun. 7, 1995, U.S. patent application Ser. No. 08/479, 476 filed Jun. 7, 1995, U.S. patent application Ser. No. 08/578,123 filed Dec. 26, 1995, U.S. patent application Ser. No. 08/565,453 and U.S. patent application Ser. No. 08/597, 003, all of which are assigned to the present assignee. The aforementioned patent and patent applications, as well as any publications mentioned elsewhere in this specification, are incorporated herein by reference. If the transmitter 210 is a semiconductor optical modulator, it is preferably a multiple quantum well (MQW) optical modulator.

In a preferred embodiment illustrated in FIG. 7, the transmitter 210 and receiver 220 are disposed side-by-side on a single substrate 230. It is within the capabilities of those skilled in the art to fabricate a transmitter 210 and receiver 220 on the same substrate. The substrate 230 is preferably attached to a mount 250, which may be an electrical header. The dual-fiber ferrule 1, the transmitter 210 and receiver 220 and the mount 250 are fixed in place within a container or sleeve 240. The container 240 is preferably hard plastic, ceramic or metal. The mount 250 includes pins or wires, not shown, which facilitate electrical connection between the transmitter 210, the receiver 220 and processing electronics, not shown, located outside of the container 240. Preferably, the container 240, the dual-fiber ferrule 1 and the mount 250 are appropriately sized for passive alignment. In other words, when the ferrule 1 and the mount 250 are placed in the container 240, the optical cores 2a, 2b in the ferrule will be optically aligned with the transmitter 210 and receiver 220.

It will be appreciated by those skilled in the art that in such a butt-coupled package illustrated in FIG. 7, the spacing between the transmitter 210 and the receiver 220 is equal to the average of the two fiber diameters. In particular, with 125 $\mu$m spacing between the fiber cores 2a, 2b, in the ferrule 1, the transmitter 210 and the receiver 220 must also be laterally separated by 125 $\mu$m. Further, it should be recognized that critical alignment is to the transmitter 210, since the optical signal from the transmitter 210 must couple into the fiber core 2a. The receiver 220 can be fabricated with a large active area compared to the optical mode size, so receiver alignment is not as critical. In addition, those skilled in the art will recognize that in the butt-coupled package illustrated in FIG. 7, the dual-fiber ferrule 1 cannot have an angled polish.

Figure 8:
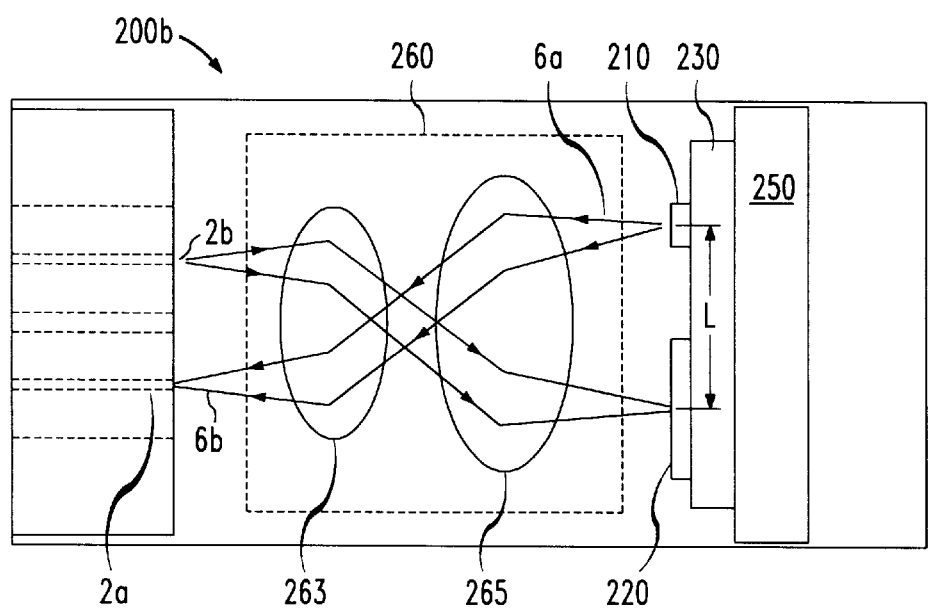
FIG. 8 illustrates an second exemplary embodiment of a dual-fiber photonics package using the dual-fiber ferrules of FIG. 1 or 2.

A second illustrative embodiment of a dual-fiber photonics package 200b is shown in FIG. 8. In the package 200b, the dual-fiber ferrule 1 is not butt-coupled to the transmitter 210 and receiver 220. Rather, the optical signals are imaged into the fiber core 2a and onto the receiver 220 using a telecentric imaging device 260. The telecentric imaging device 260 images the face of the dual fiber ferrule 1 onto the device plane 270 with magnification or demagnification as required as a function of the separation, L, between the transmitter 210 and the receiver 220. Furthermore, the telecentric imaging device 260 ensures that the optical signal received by the optical core 2a and the receiver 220 is on-axis, i.e., along the normal, to maximize fiber coupling efficiency. Ray trace 6a, a first optical signal from the transmitter 210, and ray trace 6b, a second optical signal from the optical core 2a, illustrate the functioning of the telecentric imaging device 260.

In a preferred embodiment shown in FIG. 8, the imaging device 260 is a pair of lenses 263, 265. It is within the capabilities of those skilled in the art to specify and properly place the lenses 263, 265 for telecentric imaging.

With the exception of the telecentric imaging device 260, and the location of the transmitter 210 and the receiver 220, the dual fiber photonics package 200b includes the same elements as the package 200a, including the dual-fiber ferrule 1, the transmitter 210, receiver 220, container 240 and mount 250. Preferably, the transmitter and the receiver are disposed on the same substrate.

Although a number of specific embodiments of this invention have been shown and described herein, it is to be understood that such embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

We claim:

1. A dual-fiber ferrule for receiving a first and a second bare optical fiber having respective first and second fiber cores each having a center, comprising: a rigid retaining member characterized by a longitudinal axis of symmetry, the retaining member having a hole disposed on said longitudinal axis of symmetry, the hole characterized by
    a size sufficient for receiving the first and second bare optical fiber in tight-fitting contact, and
    a geometry that provides three-line contact between the hole and each of the first and second bare optical fibers.

2. The dual-fiber ferrule of claim 1 wherein the geometry defines an ellipse.

3. The dual-fiber ferrule of claim 1 wherein the retaining member further comprises a registration feature.

4. The dual-fiber ferrule of claim 3 wherein the registration feature is selected from the group consisting of a groove, a ridge, and a flattened region.

5. The dual fiber ferrule of claim 3 wherein the retaining member terminates in an end face, and further wherein the registration feature is an angled polish of the end face of the retaining member.

6. The dual-fiber ferrule of claim 1 further comprising the first and second bare optical fiber.

7. The dual-fiber ferrule of claim 5 further comprising the first and second bare optical fiber, wherein an end of each of the first and second bare optical fiber is exposed at the end face of the retaining member, and further wherein the end of each bare optical fiber is characterized by the angled polish.

8. The dual-fiber ferrule of claim 1 wherein the retaining member terminates in an end face, and further wherein the retaining member comprises an alignment feature selected from the group consisting of a groove, a flat surface or an angled polish of the end face.

* * * * *